May 9, 1967 — E. S. GRIMMETT — 3,318,670
PRODUCTION OF ACTINIDE ALUMINIDE IN A FLUIDIZED BED
Filed Aug. 12, 1966
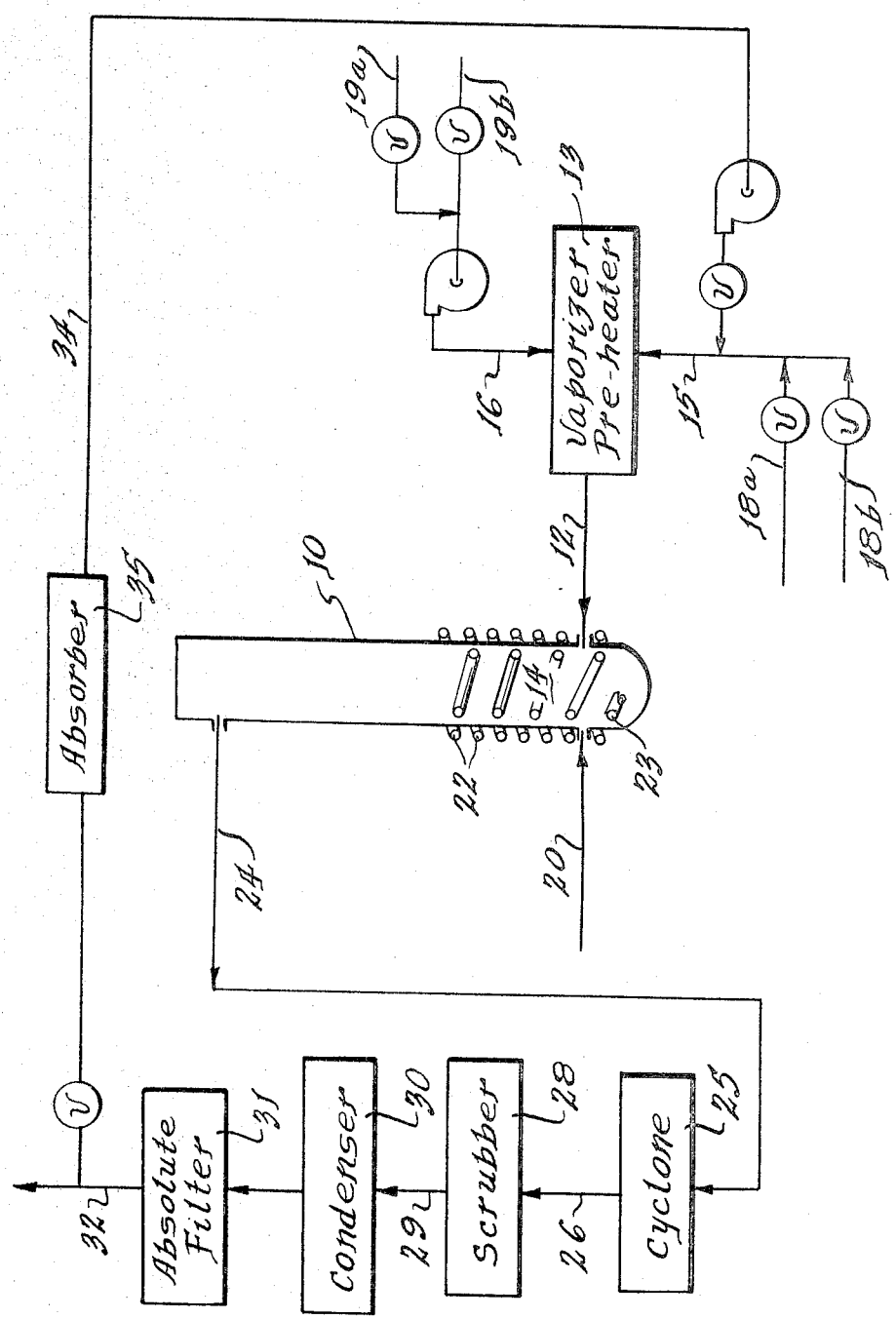
Inventor
Earl S. Grimmett
Attorney

United States Patent Office 3,318,670
Patented May 9, 1967

3,318,670
PRODUCTION OF ACTINIDE ALUMINIDE IN A FLUIDIZED BED
Earl S. Grimmett, Idaho Falls, Idaho, assignor to the United States of America as represented by the United States Atomic Energy Commission
Filed Aug. 12, 1966, Ser. No. 572,156
5 Claims. (Cl. 23—347)

The invention described herein was made in the course of, or under, a contract with the United States Atomic Energy Commission.

This invention relates to a method of producing actinide-containing ceramics and intermetallics and more particularly to the production of actinide aluminides in a fluidized bed.

Large amounts of heat are produced during the irradiation of a fuel element, and many fissile materials fail during irradiation because they have low melting points, or lose their tensile strength or become chemically reactive at elevated temperatures. Compounds of aluminum and various actinides are attractive because of their superior physical properties. In particular, the uranium aluminides have melting points in excess of 2900° F., and at temperatures greater than 2000° F., they retain most of their strength and resistance to oxidation.

Heretofore, the uranium aluminides have been prepared by powder metallurgy techniques requiring temperatures in excess of 1000° C. and pressures in the neighborhood of 30 tons per square inch. The inordinate length of time necessary to form the aluminides, sometimes as much as 16 to 20 hours, and the fact that most operations are batch are disadvantages in addition to the above-mentioned high temperatures and pressures.

This invention is applicable to produce not only actinide aluminides but also certain ceramics in a continuous process at low temperatures and atmospheric pressure. The invention comprises forming composite particles of a substrate material with an actinide chloride coating by reacting an actinyl compound or an actinide oxide with a chlorinating agent in a fluidized bed and thereafter reacting the coating and the substrate.

The drawing is a schematic of the process equipment used in the following examples.

Substrate particles are loaded into a reactor 10 and fluidized by gases introduced into the particles through line 12 after preheating in a vaporizer preheater 13, thereby forming a fluidized bed 14. Fluidizing gases, whether inert or reactant, are fed into the vaporized preheater 13 through lines 15 and 16. These gases are fed into lines 15 and 16 from source lines 18a, 18b, 19a and 19b.

After fluidized bed 14 is established, an actinyl solution is atomized and introduced into the bed through line 20. Other reactant gases are introduced with the fluidizing gases into bed 14 through line 12. If heat is required to initiate or maintain a reaction, heaters 22 are provided; if cooling is required, cooling coils 23 may be located inside reactor 10 to remove any excess heat. As the reaction takes place, off gases and entrained solids pass upwardly through reactor 10 and line 24 to a cyclone separator 25. In the cyclone separator the bulk of the entrained solids are removed, and the remaining finer solids and off gases pass through line 26 to a Venturi scrubber system 28. Smaller diameter entrained solids are removed in the scrubber 28, while any water and other condensible byproducts pass through line 29 and are removed in a condenser 30. An absolute filter 31 is used to trap any remaining dust particles before the remaining off gases are vented through line 32. In order to reduce the loss of fluidizing gas, a recycle loop 34 is provided with an absorber 35 to remove any residual acid fumes before the gas is added to the incoming fluidizing gases.

Substantially spherical substrate particles of aluminum were charged into reactor 10 and fluidized with air introduced through line 12. The temperature throughout the following steps was maintained at 350° C. An aqueous solution of uranyl nitrate was atomized with a mixture of air and argon and introduced as a mist into bed 14 through line 20; however, other solutions can be used, such as plutonyl nitrate and uranyl or plutonyl phosphate. The uranyl nitrate decomposed to form uranium trioxide that deposited as a coating on the hot aluminum particles. The deposition of the laminar oxide coating was continued until a proper weight ratio of uranium to aluminum was attained. The amount of uranium deposited is variable and depends upon the desired end product, in this case uranium trialuminide. Because uranium dioxide is less reactive than uranium trioxide, it is preferable, though not necessary, to reduce the trioxide to the dioxide to prevent undesirable side reactions. The likelihood of extraneous side reactions is lessened by fluidizing with an inert gas instead of air, so, at this time, the fluidizing gas was changed from air to argon. The trioxide reduction was accomplished by introducing methanol vapor into the fluidized bed 14 with the fluidizing gas. Methanol was used because it is relatively inexpensive but other reducing agents can be used, such as hydrogen gas or ethanol. After the reduction was completed, the bed consisted of discrete aluminum spheres surrounded by a uniform coating of uranium dioxide.

The conversion of the oxide to a halide can be accomplished in many ways. The preferred method was to introduce carbon tetrachloride vapor into bed 14 to produce uranium chloride. If a chloride is the desired halide, many reactions can be utilized, such as a combination of carbon, for instance in the form of sugar, and chlorine gas, or phosgene, or a combination of sulfur and chlorine gas, or phosphorus pentachloride, among others. The reaction between carbon tetrachloride and uranium dioxide is highly exothermic, and the feed rate must be carefully regulated to maintain control of the reaction temperature; if, however, internal cooling coils 23 are included in reactor 10, extraordinarily close control is not necessary. Since at 350° C. carbon tetrachloride will react with aluminum to produce aluminum chloride, if a uniform product is desired it is necessary to restrict the carbon tetrachloride introduced into the system to close to the stoichiometric quantity needed to convert the uranium dioxide. Excessive carbon tetrachloride will convert aluminum to aluminum chloride, thereby reducing the aluminum-to-uranium weight ratio. A reduced weight ratio results in variable end products.

After the uranium dioxide was converted to the chloride, the temperature was raised to 600° C. while continuing to fluidize with argon. At this temperature the uranium trichloride coating reacted with the aluminum core to produce substantially pure uranium trialuminide and gaseous aluminum trichloride, that volatilized from the bed 14. Although substantially pure uranium trialuminide particles were produced, uranium dialuminide or uranium tetraaluminide particles may be produced by the simple process of adjusting the weight ratio of aluminum to uranium in the aluminum-uranium trioxide particle. The particles produced by this process were hollow spheres, but if solid particles are preferred, the conversion may be effected by passing the spheres through a plasma arc flame.

A slurry of uranyl nitrate and finely ground aluminum powder may be used to produce the various uranium aluminides. The weight ratio of uranium to aluminum would depend upon the desired product. The slurry would be sprayed into a bed of uranium chloride and aluminum particles fluidized by carbon tetrachloride vapor. At about 400° C., a mixture of uranium chloride intimately mixed with aluminum particles would result, and this mixture heated to a temperature of about 600° C. would react to form the desired uranium aluminide.

The method may also be carried out by introducing a slurry of aluminum and uranyl nitrate in the desired proportions into a bed of aluminum and uranium chloride particles fluidized with air in an inert carrier. At a temperature of about 400° C. the uranyl nitrate would decompose to form uranium oxide, and at this temperature the fluidized bed would consist of intimately mixed uranium oxide and aluminum. Thereafter, the use of an inert gas and carbon tetrachloride vapor for fluidizing gases would convert the uranium oxide to a uranium chloride. The mixture of uranium chloride and aluminum would then be heated to about 600° C. to produce the desired uranium aluminide.

Ceramics such as an actinide carbide or nitride may be fabricated using this fluidized-bed technique by starting with the proper substrate materials. Discrete particles of carbon instead of aluminum as a starting material in combination with the process steps described above could be utilized to produce an actinide carbide. So also, starting with a substrate material of an actinide nitride, and reacting the halide produced by this method with a nitriding agent, such as nitrogen gas or ammonia, an actinide nitride could be produced.

It will be understood that the invention is not to be limited to the details given herein but that it may be modified within the scope of the appended claims.

The embodiments of the invention in which an exclusive property or privilege is claimed are defined as follows:

1. A method of making an actinide aluminide comprising establishing and maintaining a fluidized bed containing aluminum particles by passing an oxygen-containing gas upwardly therethrough, introducing a compound selected from the group consisting of an actinyl nitrate and an actinyl phosphate into said fluidized bed at about 350° C. whereby composite particles of aluminum coated with an actinide oxide are formed, introducing a chlorinating agent into the fluidized bed to convert the oxide coating to a chloride coating, and heating the fluidized bed to about 600° C. to cause the aluminum to react with the actinide chloride coating.

2. A method according to claim 1 wherein the actinyl nitrate is uranyl nitrate, the chlorinating agent is carbon tetrachloride.

3. A method according to claim 2 wherein the bed is fluidized with a reducing agent prior to fluidization with carbon tetrachloride to reduce the uranium oxide coating to uranium dioxide.

4. A method according to claim 1 wherein said composite particles are formed by establishing and maintaining a fluidized bed of aluminum and uranium chloride particles by passing carbon tetrachloride upwardly therethrough at about 350° C. and simultaneously feeding uranyl nitrate into said bed.

5. A method of making $UAl_3$ particles comprising establishing and maintaining a fluidized bed by passing air upwardly through a starting bed of spherical aluminum particles, spraying an aqueous solution of uranyl nitrate into the bed at 350° C. until the desired weight ratio of uranium to aluminum is attained, the uranyl nitrate thereby decomposing to $UO_3$ which deposits on the aluminum particles, discontinuing the uranyl nitrate feed, fluidizing the bed with a mixture of methanol and argon at 350° C. whereby the $UO_3$ in the coating is reduced to $UO_2$, fluidizing the bed with a mixture of $CCl_4$ and argon at 350° C. whereby the $UO_2$ in the coating is converted to $UCl_3$, and fluidizing with argon alone at a temperature of 600° C. whereby the uranium chloride reacts with aluminum to form $UAl_3$ while $AlCl_3$ is volatilized.

References Cited by the Examiner
UNITED STATES PATENTS

| 2,848,796 | 8/1958 | Eubank et al. | 75—122.7 |
| 2,917,383 | 12/1959 | Saller | 75—122.7 |
| 3,052,536 | 9/1962 | Moore | 75—122.7 |
| 3,150,975 | 9/1964 | Beaver et al. | 75—214 |
| 3,288,571 | 11/1966 | Werner et al. | 23—347 |

References Cited by the Applicant
UNITED STATES PATENTS

| 2,677,592 | 5/1954 | Carter. | |

CARL D. QUARFORTH, *Primary Examiner.*

S. J. LECHERT, JR., *Assistant Examiner.*